United States Patent
Matsuo et al.

(10) Patent No.: US 11,269,623 B2
(45) Date of Patent: Mar. 8, 2022

(54) APPLICATION DIVISION DEVICE, METHOD AND PROGRAM

(71) Applicant: NIPPON TELEGRAPH AND TELEPHONE CORPORATION, Tokyo (JP)

(72) Inventors: Kazuya Matsuo, Musashino (JP); Masahiro Yoshida, Musashino (JP); Noriyuki Takahashi, Musashino (JP); Hiroyuki Tanaka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/969,506

(22) PCT Filed: Feb. 14, 2019

(86) PCT No.: PCT/JP2019/005265
§ 371 (c)(1),
(2) Date: Aug. 12, 2020

(87) PCT Pub. No.: WO2019/160008
PCT Pub. Date: Aug. 22, 2019

(65) Prior Publication Data
US 2020/0401399 A1    Dec. 24, 2020

(30) Foreign Application Priority Data
Feb. 16, 2018  (JP) .............................. JP2018-026047

(51) Int. Cl.
*G06F 8/71*   (2018.01)
*H04L 67/10*  (2022.01)

(52) U.S. Cl.
CPC ................ *G06F 8/71* (2013.01); *H04L 67/10* (2013.01)

(58) Field of Classification Search
USPC ......................................................... 717/121
See application file for complete search history.

(56) References Cited

U.S. PATENT DOCUMENTS 8,060,865 B2 * 11/2011 Kimmerly ............. G06F 9/4418
                                                      717/126
9,715,375 B1 *  7/2017 Lee ......................... G06F 8/427
(Continued)

OTHER PUBLICATIONS

Alex Reznik, Rohit Arora, Mark Cannon, Luca Cominardi, Walter Featherstone, Rui Frazao, Fabio Giust, Sami Kekki, Alice Li, Dario Sabella, Charles Turyagyenda, Zhou Zheng. "Developing Software for Multi-Access Edge Computing." ETSI White Paper, 2017, No. 20.

(Continued)

*Primary Examiner* — John Q Chavis

(57) ABSTRACT

A function defined in source code of an application is further partitioned into a plurality of logics without depending on function definition performed by a developer. An application partitioning apparatus (1) for partitioning an application distributively processed by a plurality of information processing apparatuses into a plurality of logics includes an acquisition unit (121) which acquires source code of the application, a first partitioning unit (122) which identifies a plurality of functions defined in the source code and partitioning the source code into the plurality of functions, a determination unit (123) which determines whether each of the partitioned functions can be further partitioned according to rules set in advance, and a second partitioning unit (124) which, when it is determined that each of the partitioned function can be partitioned, partitions the function into a plurality of functions including one or a plurality of rows.

19 Claims, 7 Drawing Sheets

(56) References Cited

U.S. PATENT DOCUMENTS

| | | | | |
|---|---|---|---|---|
| 2004/0186817 | A1* | 9/2004 | Thames | G06F 8/71 |
| 2005/0039173 | A1* | 2/2005 | Tondreau | G06F 8/45 |
| | | | | 717/136 |
| 2008/0256521 | A1* | 10/2008 | O'Brien | G06F 8/45 |
| | | | | 717/133 |
| 2014/0068560 | A1* | 3/2014 | Eksten | G06F 8/70 |
| | | | | 717/120 |
| 2016/0188352 | A1* | 6/2016 | Marathe | G06F 8/41 |
| | | | | 717/145 |
| 2017/0212740 | A1* | 7/2017 | Lee | G06F 8/427 |

OTHER PUBLICATIONS

Jieyao Liu, Ejaz Ahmed, Muhammad Shiraz, Abdullah Gani, Rajkumar Buyya, Ahsan Qureshi. "Application Partitioning Algorithms in Mobile Cloud Computing: Taxonomy, Review and Future Directions." Journal of Network and Computer Applications, vol. 48, 2015.

IBM, "IBM ILOG CPLEX." Jan. 10, 2018 (Reading Day). <http://www.ilog.com/products/complex/>.

Github, Inc. "Plain Face Detector & Gender Recognizer." Jan. 10, 2018 (Reading Day). <https://github.com/MinhasKamal/GenderRecognizer>.

Jeanne Ferrante, Karl J. Ottenstein, Joe D. Warren. "The Program Dependence Graph and Its Use in Optimization." ACM Transactions on Programming Languages and Systems, vol. 9, No. 3 (1987), pp. 319-349.

Honda, Satomi et al. "Protection of outsourced applications by source code automatic segmentation." 2011 Symposium on Cryptography and Information Security (SCIS 2011). Jan. 25, 2011. Machine translation attached.

Satomi Honda, Katsunari Yoshioka, Tsutomu Matsumoto. "A Method to Divide Application for Deterring Unauthorized Use by Outsourcees." Technical Research Report by the Institute of Electronics, Information and Communication Engineers, vol. 111, No. 454 (2012), pp. 15-22. Machine translation attached.

Liu Jie Yao, Ejaz Ahmed, Muhammad Shiraz, Abdullah Gani. "Application Partitioning Approaches for Mobile Cloud Computing: Review, Issues, and Challenges." 2015.

* cited by examiner

Fig. 5

```
for (int i=0; i<5; i++) {
    if (i>0) {
        a[i] = b[i] + c[i-1]; ... L1
    }
    else {
        a[i] = b[i]; ... L2
    }
    c[i] = (double) a[i]/10; ... L3
}
```

⬆ PARTITIONING

```
for (int i=0; i<5; i++) {
    if (i==0) {
        a[i] = b[i]; ... L1
    }
}
for (int i=0; i<5; i++) {
    if (i>0) {
        a[i] = b[i] + c[i-1]; ... L2
    }
}
for (int i=0; i<5; i++) {
    c[i] = (double) a[i]/10; ... L3
}
```

APPLICATION DIVISION DEVICE, METHOD AND PROGRAM

CROSS-REFERENCE TO RELATED APPLICATIONS

This application is a 371 U.S. National Phase of International Application No. PCT/JP2019/005265, filed on Feb. 14, 2019, which claims priority to Japanese Application No. 2018-026047, filed on Feb. 16, 2018. The entire disclosures of the above applications are incorporated herein by reference.

TECHNICAL FIELD

One aspect of the present invention relates to an application partitioning apparatus and method, and a program for partitioning a distributively processed application into a plurality of logics in a vertical distribution environment.

BACKGROUND ART

With the recent spread of the Internet-of-Things (IoT), various apparatuses around users are connected to the Internet and collection and utilization of information acquired through such apparatuses have become easy. With this background, in order to realize efficiency of information collection and fast response time, anticipation for a distributed application in which a plurality of application logics (a component that performs some kind of process on input data and outputs the data is referred to as "logic" below) are arranged and executed in geographically distributed machines in a vertical distribution environment is increasing. For example, it is possible to reduce communication traffic when data is transmitted to a cloud server by arranging a logic that integrates information transmitted from IoT apparatuses in a relay server. In addition, it is possible to decrease a response time of an application by arranging a logic that frequently communicates with a terminal of a user of the application in a server geographically close to the user.

It is known that, to operate an application in a plurality of machines in a distributed manner, it is necessary to partition the application into a plurality of logics and arrange the logics in the respective machines (refer to Non Patent Literature 1, for example). Here, the performance of the application considerably changes according to how the application is partitioned and how the application is arranged in a distributed manner. This is caused by the fact that transfer of data between logics is performed through communication between machines and a processing time of a logic strongly depends on the performance of a machine that operates the logic. Accordingly, in order to maximize the application performance, a technology for determining optimal application partitioning and arrangement is required. For example, a method of partitioning a function defined by a developer into a single logic and automatically determining optimal distributed arrangement that can maximize certain performance (traffic between machines, throughput, processing time, etc.) is known (refer to Non Patent Literature 2, for example). Here, "function" generally refers to an arrangement of processes necessary to obtain a certain output. For example, when a distance between two designated points is desired to be calculated, a process of calculating a difference between x coordinates of the points, a process of calculating a difference between y coordinates thereof, and a process of calculating a square root of a value obtained by adding the squares of the differences are defined as a single function. In addition, to determine optimal distributed arrangement, a method of solving an optimization problem including a linear programming problem can be used (refer to Non Patent Literature 3, for example).

As an example of an application that is an object of such distributed arrangement, a face recognition application in which a plurality of functions are defined in source code is disclosed (refer to Non Patent Literature 4, for example). Furthermore, it is known that there are a data dependency relation and a control dependency relation between processing logics in a program (refer to Non Patent Literature 5, for example).

CITATION LIST

Non Patent Literature

[NPL 1] Alex Reznik, et al., "Developing Software for Multi-Access Edge Computing", ETSI White Paper, No. 20, September 2017

[NPL 2] Jieyao Liu, et al., "Application Partitioning Algorithm s in Mobile Cloud Computing: Taxonomy, Review and Future Directions", Journal of Network and Computer Applications, vol. 48, 2015

[NPL 3] IBM ILOG CPLEX, [online], Internet <URL: http://www.ilog.com/products/cplex/>

[NPL 4] Github, Inc., Face Recognition: Plain Face Detector & Gender Recognizer, [online], Internet <URL: https://github.com/MinhasKamal/GenderRecognizer>

[NPL 5] Jeanne Ferrante, et al., "The Program Dependence Graph and Its Use in Optimization", ACM Transactions on Programming Languages and Systems, vol. 9, no. 3, pp. 319-349, 1987

SUMMARY OF THE INVENTION

Technical Problem

The conventional technology pertaining to application partitioning and arrangement has the following problems because a function defined by a developer is treated as a single logic when an application is partitioned into a plurality of logics and arranged in respective machines in a distributed manner.

Firstly, when a function defined by a developer does not have an optimal form regarding maximization of application performance (for example, when all processes are described in a single function, and the like), there are cases in which application performance cannot be improved in the conventional technology in which a function defined by a developer is treated as a single logic.

Secondly, requesting a developer to make functions have optimal forms regarding maximization of application performance during development of an application causes the developer to develop functions while paying attention to various performance indexes such as the amount of data transferred between functions and a processing time of each function, increasing a burden in development.

An object of the present invention devised in view of the aforementioned circumstances is to provide an application partitioning apparatus and method, and a program which can further partition a function into a plurality of logics without depending on function definition performed by a developer.

Means for Solving the Problem

To accomplish the aforementioned object, a first aspect of the present invention is an application partitioning apparatus for partitioning an application distributively processed by a plurality of information processing apparatuses into a plurality of logics, the application partitioning apparatus including: an acquisition unit which acquires source code of the application; a first partitioning unit which identifies a plurality of functions defined in the source code and partitions the source code into the plurality of functions; a determination unit which determines whether each of the partitioned functions can be further partitioned according to rules set in advance; and a second partitioning unit which, when it is determined that each of the partitioned functions can be partitioned, partitions the functions into a plurality of functions including one or a plurality of rows.

In a second aspect of the present invention, the application partitioning apparatus further includes a distributed arrangement unit which allocates the plurality of functions partitioned by the first partitioning unit and the second partitioning unit to the plurality of information processing apparatuses.

In a third aspect of the present invention, the distributed arrangement unit includes an arrangement determination unit which determines optimal distributed arrangement to the plurality of information processing apparatuses in units of functions with respect to a function that has not been partitioned by the second partitioning unit from and in units of functions after partitioning with respect to a function that has been partitioned by the second partitioning unit, among the plurality of functions defined in the source code.

In a fourth aspect of the present invention, the determination unit determines that two processes can be partitioned on the basis of determination that a data dependency relation and a control dependency relation are not present between the two processes according to the rules.

In a fifth aspect of the present invention, the determination unit determines that two processes can be partitioned on the basis of determination that there is a data dependency relation or a control dependency relation between the two processes but an execution sequence is not reversed when the two processes have been partitioned according to the rules.

In a sixth aspect of the present invention, the determination unit determines that two processes cannot be partitioned on the basis of determination that there is a data dependency relation between the two processes due to a data type for which standard setting for serialization and deserialization is not made according to the rules.

Effects of the Invention

According to the first aspect of the present invention, source code of an application distributively processed by a plurality of information processing apparatuses is acquired, a plurality of functions defined in the source code are identified, and the source code is partitioned into the plurality of functions. Then, it is determined whether each partitioned function can be further partitioned according to rules set in advance, and when it is determined that each partitioned function can be partitioned, it is determined that the function is composed of a plurality of logics, and the function is partitioned into a plurality of functions including one or a plurality of rows. Accordingly, it is possible to further partition a function defined by a developer into a plurality of logics (functions) without depending on function definition performed by the developer.

According to the second aspect of the present invention, a plurality of partitioned functions and a plurality of partitioned logics are allocated to a plurality of information processing apparatuses. Accordingly, it is possible to automatically perform an application partitioning process to a process of arranging a plurality of partitioned functions in a plurality of information processing apparatuses in a distributed manner without depending on the operation of a developer or a system operator.

According to the third aspect of the present invention, optimal distributed arrangement to a plurality of information processing apparatuses is determined in units of functions with respect to a function that has not been partitioned and in units of functions after partitioning with respect to a function that has been partitioned from among a plurality of functions defined in source code. Accordingly, it is possible to optimize distributed arrangement of partitioned functions under more detailed conditions to realize optimal application distributed process without depending on function definition performed by a developer.

According to the fourth aspect of the present invention, it is determined that two processes can be partitioned on the basis of determination that a data dependency relation and a control dependency relation are not present between the two processes. Accordingly, it is possible to determine whether a function can be further partitioned on the basis of determination of presence or absence of a dependency relation between processes without depending on function definition performed by a developer.

According to the fifth aspect of the present invention, it is determined that two processes can be partitioned on the basis of determination that there is a data dependency relation or a control dependency relation between the two processes but an execution sequence is not reversed when the two processes have been partitioned. Accordingly, it is possible to determine whether a function can be further partitioned on the basis of determination of presence or absence of reversal of the execution sequence without depending on function definition performed by a developer.

According to the sixth aspect of the present invention, it is determined that two processes cannot be partitioned on the basis of determination that there is a data dependency relation between the two processes due to a data type for which standard setting for serialization and deserialization is not made. Accordingly, it is possible to determine whether a function can be further partitioned on the basis of determination of a data type that causes the two processes to be in a data dependency relation without depending on function definition performed by a developer.

That is, according to the aspects of the present invention, it is possible to provide an application partitioning apparatus and method, and a program which can further partition a function into a plurality of logics without depending on function definition performed by a developer.

BRIEF DESCRIPTION OF DRAWINGS

FIG. 5 is a diagram showing an example of a part that cannot be partitioned in units of rows.

DESCRIPTION OF EMBODIMENTS

Hereinafter, embodiments according to the present invention will be described with reference to the drawings.

One Embodiment (Configuration)

Figure 1:
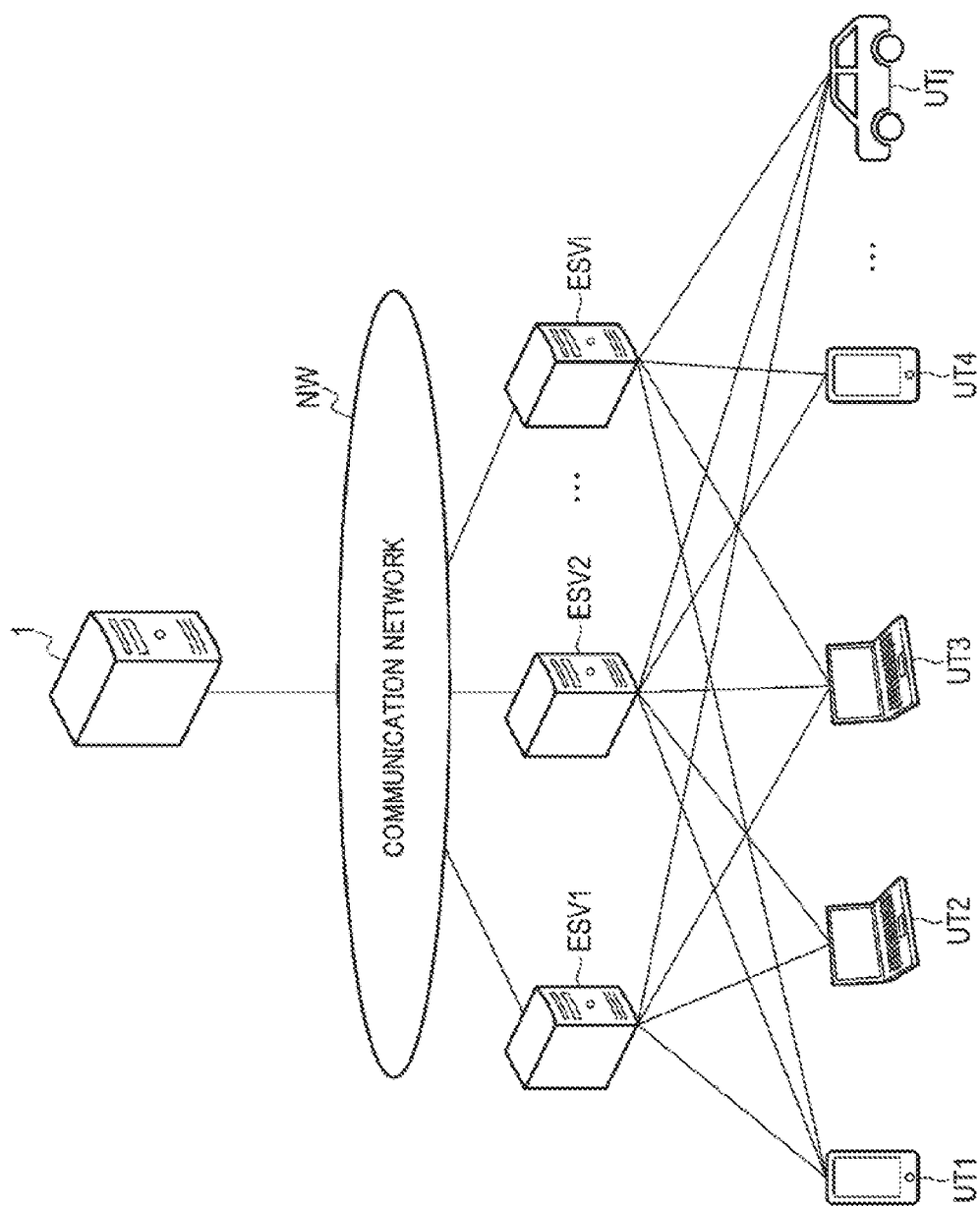
FIG. 1 is a schematic configuration diagram showing an example of a system including an application partitioning apparatus according to one embodiment of the present invention.

FIG. 1 is a schematic configuration diagram showing an example of a system including an application partitioning apparatus according to one embodiment of the present invention. This system includes an application partitioning apparatus 1 which can perform communication through a communication network NW, edge servers ESV1, ESV2, . . . , ESVi (integrally referred to as an edge server ESV) in charge of an application distributed process, and user terminals UT1, UT2, UT3, UT4, UTj (integrally referred to as a user terminal UT hereinafter) which can use an application on a cloud through one or a plurality of edge servers ESV. For example, a smartphone, a laptop computer, a car, and other IoT apparatuses may be used as the user terminal UT. Meanwhile, the illustrated user terminal UT is merely an example and user terminals may be fixed terminals or mobile terminals and may include an arbitrary number of various apparatuses. In addition, the user terminal UT does not necessarily pass through the edge server ESV and can use applications arranged on a cloud through the communication network NW without passing through the edge server ESV.

The edge server ESV constructs a small-scale data center closer to a user for a cloud environment developed on a large-scale data center and includes various machines such as server computers and personal computers, for example.

The communication network NW is composed of, for example, an Internet protocol (IP) network represented by the Internet and a plurality of access networks for accessing the IP network. For example, cellular telephone networks operating in 3G, 4G or the like, wireless local area networks (LANs), and the like as well as wired networks using optical fibers are used as access networks.

The application partitioning apparatus 1 is an application partitioning apparatus according to one embodiment and is a server computer or a personal computer which can be operated by a system manager or the like.

Figure 2:
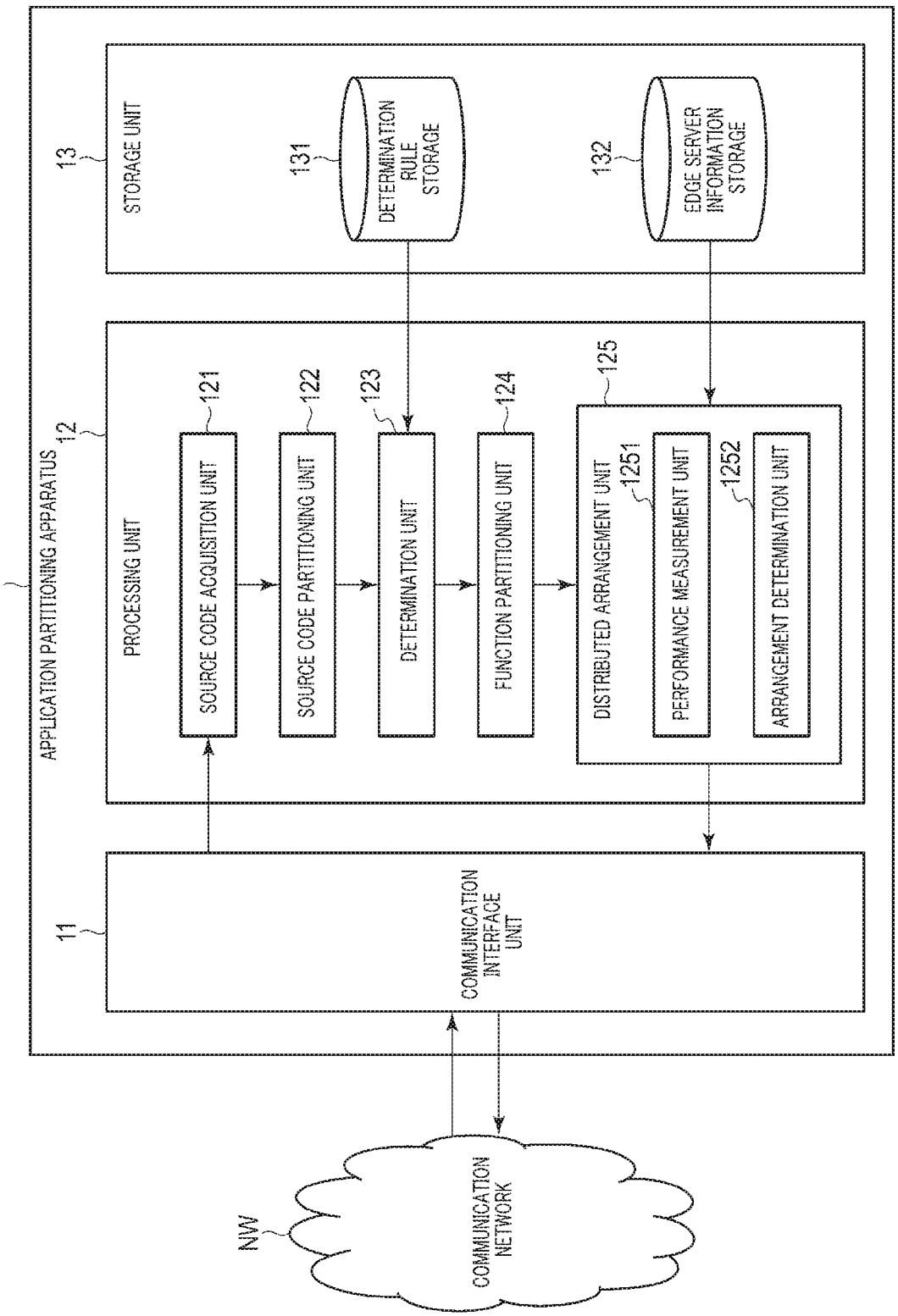
FIG. 2 is a block diagram showing a functional configuration of the application partitioning apparatus shown in FIG. 1.

FIG. 2 is a block diagram showing a functional configuration of the application partitioning apparatus 1 shown in FIG. 1. The application partitioning apparatus 1 includes a communication interface unit 11, a processing unit 12, and a storage unit 13.

The communication interface unit 11 includes a wired or wireless interface, for example, and allows transmission and reception of information between an application (app) management server (shown) arranged on a cloud and an edge server ESV through the communication network NW. Meanwhile, functions of the app management server and functions of the application partitioning apparatus 1 may be installed in one cloud computer.

The storage unit 13 uses a nonvolatile memory for which writing and reading can be performed at any time, such as a hard disk drive (HDD) or a solid state drive (SSD), for example, as a storage medium and includes a determination rule storage 131 and an edge server information storage 132 in addition to a program storage as storage regions necessary to realize the present embodiment.

The determination rule storage 131 stores determination rules used to determine whether a function defined by a developer can be further partitioned. The determination rules will be described in detail later.

The edge server information storage 132 stores information about the edge server ESV, such as positional information, an operating environment and processing performance.

Meanwhile, the determination rule storage 131 and the edge server information storage 132 may not necessarily be included in the application partitioning apparatus 1 and may be provided in an external storage device, for example, the app management server, a database server or the like arranged in the cloud. In this case, the application partitioning apparatus 1 acquires and uses necessary data by accessing the database server or the like in the cloud through the communication network NW.

The processing unit 12 has a hardware processor such as a central processing unit (CPU) which is not shown and a working memory and includes a source code acquisition unit 121, a source code partitioning unit 122, a determination unit 123, a function partitioning unit 124, and a distributed arrangement unit 125 as processing functions necessary to implement the present embodiment. These control functions are realized by the hardware processor executing a program stored in the program storage of the storage unit 13.

The source code acquisition unit 121 acquires source code of an application that is an object of a distribution process from the app management server, for example.

The source code partitioning unit 122 identifies a plurality of functions defined in the acquired source code and partitions the source code into the plurality of functions.

The determination unit 123 determines, with respect to each of the partitioned functions, whether there is a part which can be further partitioned according to determination rules stored in the determination rule storage 131.

When it is determined that a function has a part that can be further partitioned, the function partitioning unit 124 partitions the function into a plurality of logics (functions) at the part that can be partitioned. Here, a partitioning unit is a row of the source code.

The distributed arrangement unit 125 includes a performance measurement unit 1251 and an arrangement determination unit 1252.

The performance measurement unit 1251 measures performance in an operating environment with respect to each function that is an object of distribution process.

The arrangement determination unit 1252 determines arrangement of logics (functions) in which required performance is maximized on the basis of the measured performance and attribute information including information representing an arrangement position, processing performance and the like of each edge server stored in the edge server information storage 132.

(Operation)

Figure 3:
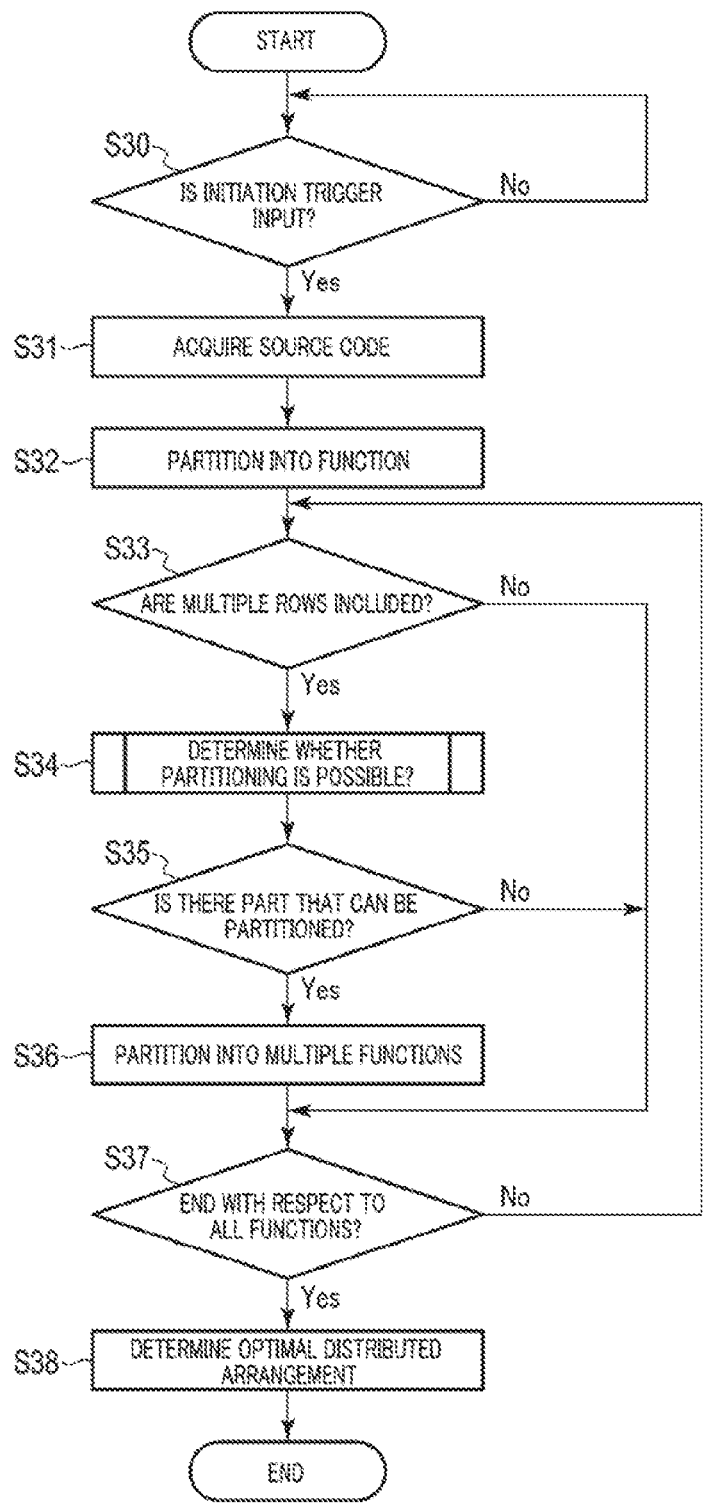
FIG. 3 is a flowchart showing an example of a processing procedure performed by the application partitioning apparatus shown in FIG. 2.

Next, an information processing operation performed by the application partitioning apparatus 1 configured as above will be described. FIG. 3 is a flowchart showing the processing procedure and processing details.

(1) Reception of Initiation Trigger

The application partitioning apparatus 1 monitors presence or absence of a trigger for initiating an application partitioning process in step S30. In this state, the application partitioning apparatus 1 performs the following process when an app developer or a system manager inputs an application partitioning process initiation request through a management terminal and the initiation request is received as a trigger.

(2) Acquisition of Source Code

The application partitioning apparatus 1 acquires source code of an application that is an object of a distribution process from the app management server, for example, under the control of the source code acquisition unit 121 in step S31. Meanwhile, the source code of the application may be acquired from the management terminal used by the app developer or the system manager.

(3) Partitioning of Source Code into Functions

The application partitioning apparatus 1 identifies a plurality of functions defined in the source code and partitions the source code into the plurality of functions under the control of the source code partitioning unit 122 in step S32.

(4) Determination of Whether Partitioning can be Performed for Each Row

The application partitioning apparatus 1 determines whether each partitioned function includes a plurality of rows in step S33. When a function is composed of a process of one row, further partitioning is not executed and the process proceeds to step S37. When a function includes a plurality of rows, the process proceeds to step S34.

The application partitioning apparatus 1 determines whether each partitioned function can be further partitioned for each row according to determination rules stored in the determination rule storage 131 under the control of the determination unit 123 in step S34.

(4-1) Determination Rules

Here, when a function is intended to be partitioned through a process in units of rows on the assumption that an application is arranged in a distributed manner in different machines, the function cannot be simply partitioned for each row. This is because a part that can be partitioned and a part that cannot be partitioned are presented in source code. FIG. 5 shows an example of a part that cannot be partitioned in units of rows. In FIG. 5, when the for loop on the left of the figure is partitioned as in the figure and sequentially executed from the upper process, the execution sequence of a process L2 and a process L3 changes and a numerical value stored in a[i] changes. This is because output data of L3 becomes input data of L2 (being in a data dependency relation). Such partitioning can change the original output result of the function as well as the operation of the entire application, and thus should not be performed. In addition, with respect to a process of determining whether to execute the following process according to a result of the corresponding process, that is, a process in a control dependency relation, such as an if loop, a break loop, or the like, there are cases in which the operation of the application changes when the execution sequence is reversed, and thus it is necessary to be cautious about partitioning.

Furthermore, the type of data exchanged between processes also forms a place where it is difficult to perform partitioning in units of rows. This is because there are data types for which standard setting has been made such that transmission between different machines can be performed, that is, serialization can be performed, and data types for which standard setting has not been made. With respect to a data type for which standard setting of serialization has not been made, it is not impossible to perform serialization by adding a process. However, with respect to data types defined by other developers, such as data types in a library open to the public, there are cases in which the library is compiled and it is considerably difficult to add a process for serialization according to a development language.

To cope with such conditions, in one embodiment of the present invention, three rules (determination rules) in function partitioning are defined.

Rule 1) Two processes that are not in a data dependency relation and a control dependency relation can be partitioned.

Rule 2) With respect to two processes in a data dependency relation and a control dependency relation, the processes can be partitioned if the execution sequence is not reversed according to partitioning.

Rule 3) With respect to two processes in a data dependency relation, the processes can be partitioned when they depend on a data type for which standard setting of serialization and deserialization has been made.

By using the aforementioned rules, it is possible to partition a function defined by a developer such that it can be arranged in different machines without changing the operation of the entire application.

(4-2) Determination Flow

Figure 4:
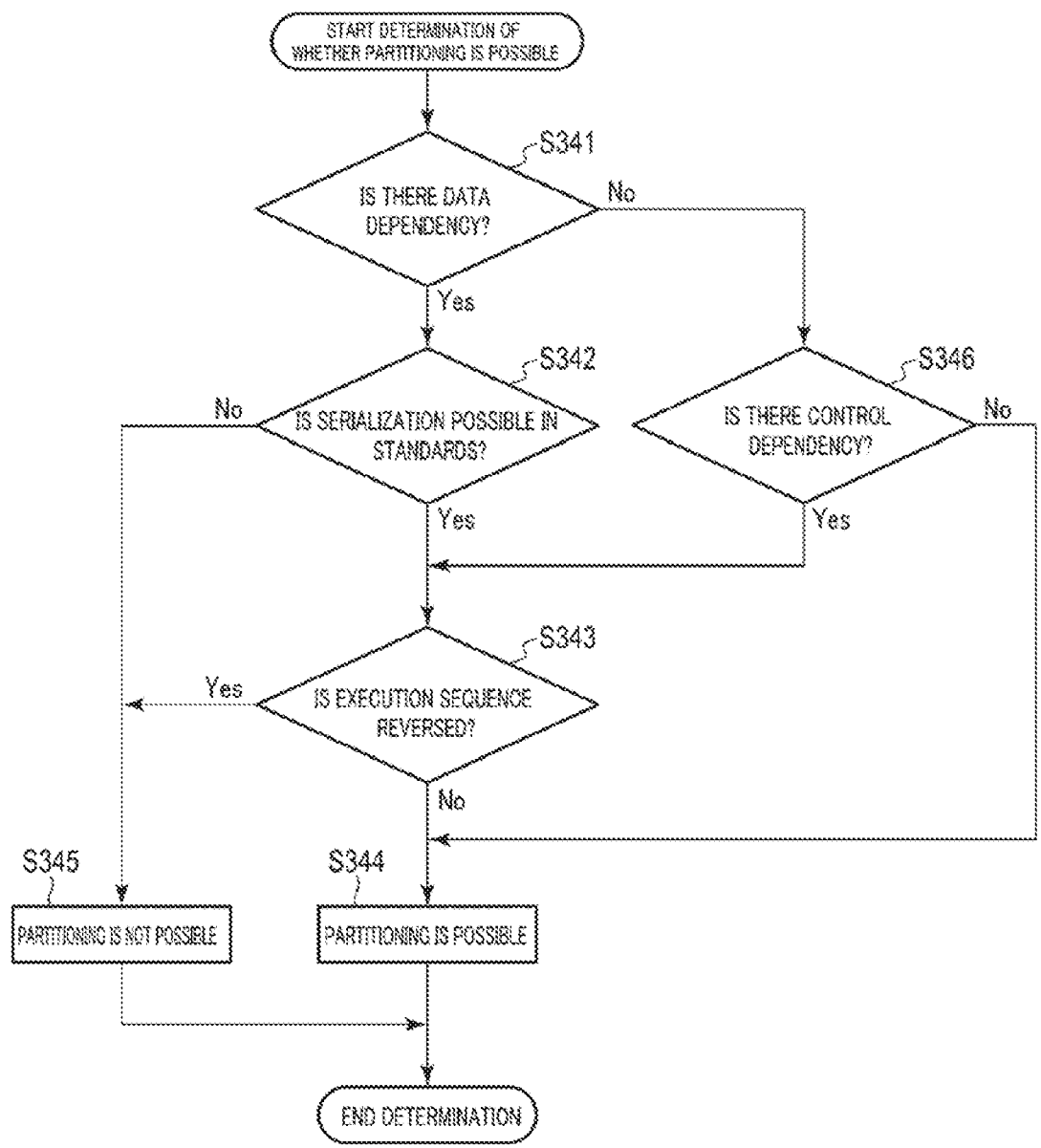
FIG. 4 is a flowchart showing an example of a process of determining whether partitioning can be performed from among processes shown in FIG. 3.

FIG. 4 is a flowchart showing an example of a determination process performed by the determination unit 123 in step S34 of FIG. 3. The determination unit 123 identifies a part that can be further partitioned with respect to each function by determining whether two processes can be partitioned according to the aforementioned determination rules.

First, the determination unit 123 determines whether there is a data dependency relation between the two processes in step S341. When it is determined that there is a data dependency relation, the process proceeds to step S342.

The determination unit 123 determines whether the data dependency relation between the two processes is due to data that can be serialized in standards in step S342. When it is determined that the data dependency relation is due to data that can be serialized in standards, the process proceeds to step S343.

The determination unit 123 determines whether the execution sequence is reversed when the two processes have been partitioned in step S343. When it is determined that the execution sequence is not reversed, the process proceeds to step S344, it is determined the two processes can be partitioned, and determination ends. On the other hand, when it is determined that the execution sequence is reversed in step S343, the determination unit 123 proceeds to step S345, determines that the two processes cannot be partitioned and ends determination.

When it is determined that the data dependency relation between the two processes is not due to data that can be serialized in the standards in step S342, the determination unit 123 proceeds to step S345, determines that the two processes cannot be partitioned and ends determination.

When it is determined that there is no data dependency relation between the two processes in step S341, the determination unit 123 proceeds to step S346 and determines whether there is a control dependency relation between the two processes. When it is determined that there is a control dependency relation, the determination unit 123 proceeds to step S343 and determines whether the execution sequence is reversed when the two processes have been partitioned, as described above. On the other hand, when it is determined that there is no control dependency relation in step S346, the determination unit 123 proceeds to step S344, determines that the two processes can be partitioned and ends determination.

The determination unit 123 repeatedly executes the above-described determination process in order to identify a part that can be partitioned and a part that cannot be partitioned with respect to the function that is a determination object.

(5) Partitioning of Function

The application partitioning apparatus 1 receives the determination result of step S34 and determines whether there is a part that can be partitioned with respect to the function that is the object in step S35. When there is a part that can be partitioned, the application partitioning apparatus 1 proceeds to step S36 and further partitions the function into a plurality of functions at the part that can be partitioned under the control of the function partitioning unit 124. When it is determined that there is no part that can be partitioned in step S35, the application partitioning apparatus 1 skips step S36 and proceeds to step S37.

The application partitioning apparatus 1 determines whether determination of whether all functions defined in the acquired source code can be further partitioned (and a partitioning process when a function can be partitioned) has been performed in step S37. When it is determined that determination with respect to all functions does not end, the application partitioning apparatus 1 returns to step S33 and repeats processes of S33 to S36 with respect to functions for which determination does not end. When it is determined that determination with respect to all functions ends in step S37, the application partitioning apparatus 1 proceeds to step S38.

(6) Determination of Arrangement of Logics (Functions)

Subsequently, the application partitioning apparatus 1 determines optimal distributed arrangement of functions in machines in order to operate the application in a plurality of machines in a distributed manner under the control of the distributed arrangement unit 125 in step S38. That is, with respect to all functions defined in the source code of the application, the application partitioning apparatus 1 determines arrangement destination machines that can maximize required performance for each function after partitioning with respect to a function partitioned into a plurality of functions in step S36 and for each function with respect to a function that has not been partitioned.

Figure 6:
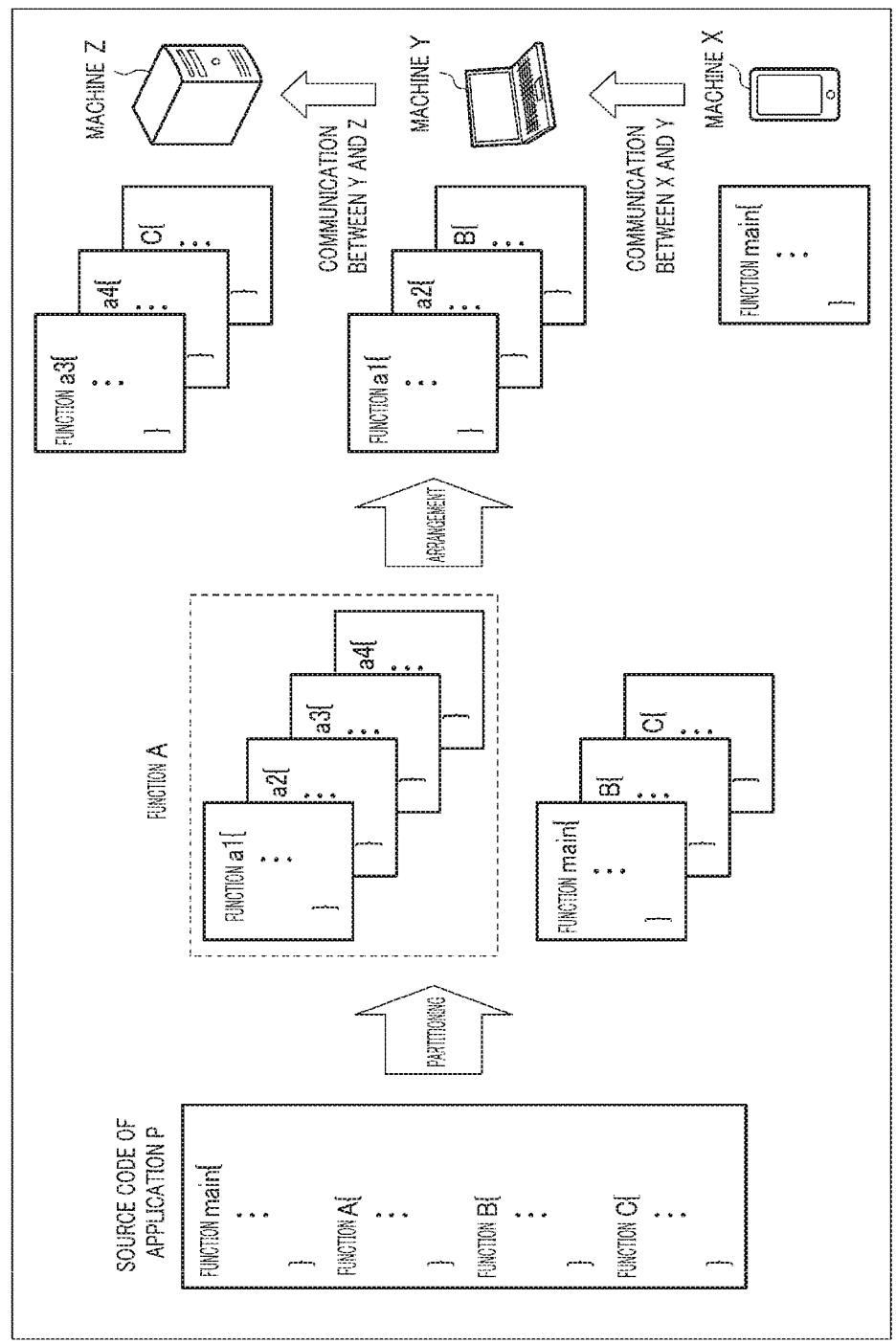
FIG. 6 is a diagram showing an image of function partitioning and arrangement performed by the application partitioning apparatus according to one embodiment.

FIG. 6 is a diagram showing an image of partitioning and arrangement of functions performed by the application partitioning apparatus 1 according to one embodiment. Here, description is based on the assumption that a function A is composed of processes of four rows and other functions are composed of a process of one row. First, source code of an application P is acquired through the communication network NW or the like and each function defined in the source code of the application P is partitioned as one logic. Thereafter, the process of each row is partitioned into different functions with respect to each function, and arrangement destination machines that can maximize required performance are determined for these functions. Accordingly, in the example shown in FIG. 6, the function A is further partitioned into four functions (functions a1 to a4) which are arranged in different machines. In this manner, a function (function A) defined by a developer is further partitioned into a plurality of logics (functions a1 to a4) and arranged in a plurality of machines in a distributed manner in one embodiment.

Figure 7:
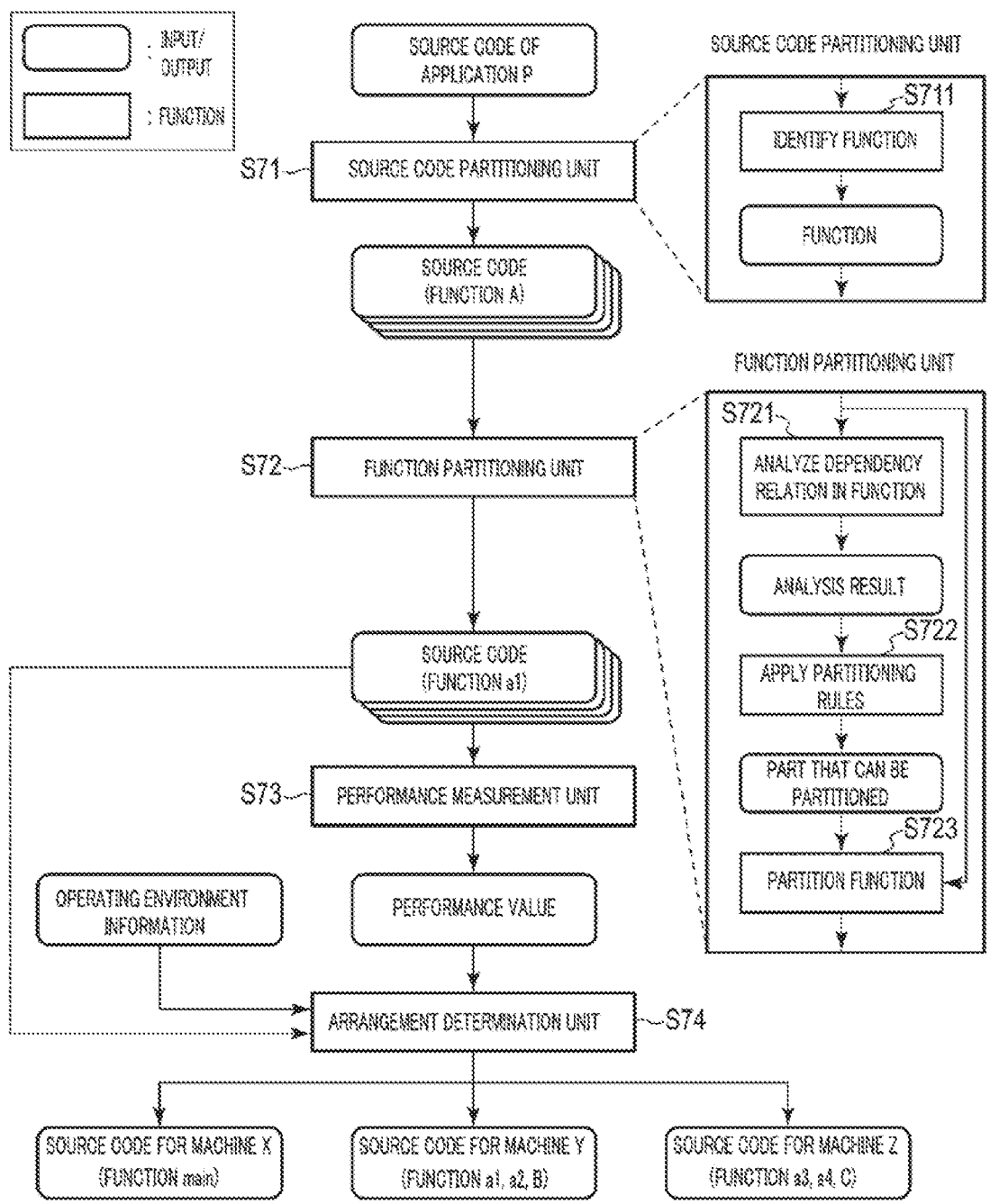
FIG. 7 is a diagram showing a flow of function partitioning and arrangement performed by the application partitioning apparatus according to one embodiment.

FIG. 7 is a diagram showing an example of a function partitioning and arrangement flow executed by the application partitioning apparatus 1 according to one embodiment. First, in step S71, functions in acquired source code are identified by the source code partitioning unit (step S711) and the source code is partitioned into the functions (functions A, B and C in FIG. 6). The functions are output to the function partitioning unit, and the function partitioning unit analyzes a data dependency relation and a control dependency relation between processes in a function (step S721) in step S72. Thereafter, the above-described rules are applied to the analysis result (step S722) and a part that can be partitioned is identified. Each function (function A in FIG. 6) is partitioned into a plurality of functions (functions a1 to a4 in FIG. 6) on the basis of the acquired part that can be partitioned (step S723). In this manner, the source code is partitioned for respective functions (logics).

Then, the performance measurement unit measures the performance of each function in an operating environment in step S73. For example, each function is operated multiple times in a machine Z, an average time required until the end of processing is set as a processing time of the function, and the processing time is used as a performance value in the machine Z. The arrangement determination unit calculates logic arrangement that maximizes required performance by solving the above-described optimization problem including a linear programming problem on the basis of operating environment information such as performance values obtained as described above, network delay between machines, and a memory of each machine in step S74.

For example, an "arrangement that minimizes traffic between machine from among arrangements in which a processing time is within 500 milliseconds" is calculated on the basis of the quantity of input/output data of each function, a processing time of each arrangement destination candidate in a machine, and network delay between machines. In addition, as another example, calculation of "an arrangement that minimizes traffic between machine from among arrangements in which memory usage in each machine does not exceed 70%" on the basis of the amount of input/output data of each function, memory usage of each arrangement destination candidate of each function in a machine, and a memory of each machine may be conceived.

(7) Verification of System

To check the validity of the system in which applications are arranged in a distributed manner by the application partitioning apparatus 1 according to one embodiment, the following environments were assumed and comparative verification was performed using the face recognition application opened in Github.com (https://github.com/MinhasKamal/GenderRecognizer) on the Internet, for example.

(i) A user terminal such as a smartphone or a notebook PC and two types of machines of a cloud are present.

(ii) Face recognition is performed on an image stored in the user terminal and only a face picture assigned with gender information is stored on the cloud. (Accordingly, there is a condition that a process of outputting the face picture to a machine cannot be arranged in machines other than a machine that assumes the cloud.)

(iii) An application performance to be maximized is traffic in an application layer between the user terminal and the cloud.

(iv) An object for which face recognition is performed is a group picture (423 [KB]) of 25 persons.

Here, the following functions are mainly defined in source code of the aforementioned face recognition application.

(Function 1) snipFace function: this performs face detection and cuts only the detected part off a picture.

(Function 2) predict function: this recognizes whether a person captured in an input face picture is a male or a female.

(Function 3) main function: this calls the snipFace function to count the number of face pictures, calls the predict function for all face pictures, assigns the results to face pictures and outputs the face pictures to a machine.

When the conventional technology is used, source code in which each of the aforementioned functions has been partitioned as a single logic is output. However, in a situation in which a process of outputting an image to a machine can be arranged only on the cloud, the main function can be arranged only on the cloud and thus the arrangement determination unit calculates that a combination in which all functions are arranged on the cloud minimizes traffic. In this case, traffic between the user terminal and the cloud has the group picture of 423 [KB].

On the other hand, when one embodiment is used, since functions are identified as in the conventional technology and then the function partitioning unit partitions each function in units of rows, the main function serving as a bottleneck in the conventional technology can be partitioned into a function group that calls each function and a function that outputs a face picture to a machine. Accordingly, the arrangement determination unit calculates that a combination in which the snipFace function and a function that calls the snipFace function and counts the number of face pictures are arranged in the user terminal and other functions are arranged in the cloud minimizes traffic. In this case, traffic between the user terminal and the cloud is 71 [KB] obtained by adding the total size of face pictures to the size of information on the number of pictures and thus traffic reduction of 85% can be achieved as compared to the conventional technology.

When the application partitioning apparatus 1 according to one embodiment is used in this manner, optimization can be performed under more detailed conditions than those in which partitioning is performed in units of functions. Further, since a function defined by a developer is further finely partitioned, application partitioning and arrangement capable of maximizing application performance can also be performed for an object of which functions are not finely partitioned, such as source code in which all processes are written as a single function. Accordingly, the developer can develop functions without paying attention to performance such as the amount of data transferred between functions and a processing time of each function.

(Effects)

As described above, in one embodiment of the present invention, source code of an application is acquired, a plurality of functions defined in the source code are identified, and the source code is partitioned into the plurality of functions first. Then, with respect to each of the partitioned functions, it is determined whether each partitioned function can be further partitioned in units of rows according to determination rules set in advance, and when it is determined that each partitioned function can be partitioned in units of rows, the function is further partitioned into a plurality of logics (functions) in units of rows.

Therefore, according to one embodiment, it is possible to further partition a function defined in the acquired source code into logics in units of rows without depending on function definition performed by a developer. That is, it is possible to partition a function defined by the developer such that it can be arranged in different machines without changing the operation of an entire application and without imposing an unnecessary burden on the developer when a distribution application is developed.

In addition, according to one embodiment, partitioned functions are allocated to a plurality of machines X, Y and Z. Accordingly, it is possible to realize a more efficient application distribution process using more subdivided functions without depending on function definition performed by a developer.

Furthermore, according to one embodiment, optimal distributed arrangement to a plurality of machines X, Y and Z is determined for each function with respect to functions that are not partitioned from among a plurality of functions defined in source code and for each function after partitioning with respect to functions that have been partitioned. Accordingly, it is possible to solve the optimization problem using more subdivided functions with respect to an arrangement destination of each function per application distribution process and achieve higher application performance. In addition, it is possible to automatically perform the application partitioning process to the process of arranging a plurality of partitioned logics in a plurality of machines X, Y and Z in a distributed manner without depending on the operation of the developer or the system operator.

Furthermore, according to one embodiment, it is determined that two processes can be partitioned on the basis of determination that there is no data dependency relation and control dependency relation between the two processes according to rule 1. Accordingly, it is possible to determine whether to further partition a function into processes in units of rows through a simple method of determining presence or absence of a dependency relation between processes without depending on function definition performed by a developer.

In addition, according to one embodiment, it is determined that two processes can be partitioned on the basis of determination that there is a data dependency relation and a control dependency relation between the two processes but the execution sequence is not reversed when the two processes have been partitioned according to rule 2. Accordingly, it is possible to determine whether to further partition a function into processes in units of rows even when the data dependency relation or the control dependency relation is present using a simple method of determining presence or absence of reversal of the execution sequence without depending on function definition performed by a developer.

In addition, according to one embodiment, it is determined that two processes cannot be partitioned on the basis of determination that the two processes are in a data dependency relation due to a data type for which standard setting for serialization and deserialization is not made according to rule 3. Accordingly, it is possible to determine whether to further partition a function into processes in units of rows on the basis of the type of data involved in the data dependency relation without depending on function definition performed by a developer even when there is a data dependency relation between two processes.

When a function defined by a developer does not have an optimal form regarding maximization of application performance (e.g., a case in which all processes are described in a single function, and the like), it is impossible to perform application partitioning and arrangement which can maximize application performance in the conventional technology. Even in such a case, according to one embodiment, as described above, it is possible to determine optimal application partitioning and arrangement without depending on function definition performed by the developer by further partitioning a function defined by the developer into processes in units of rows and calculating arrangement of processes which can maximize performance for a group of the processes.

Furthermore, even when a developer has developed functions without paying attention to performance indexes such as the amount of data transferred between functions and a processing time of each function, it is possible to calculate application partitioning and arrangement which can maximize application performance by applying the invention according to one embodiment, and thus burden on the developer during distribution application development is reduced.

When a function defined by a developer is partitioned, if the function is simply partitioned into a process of each row, application operation is likely to change. Accordingly, there is a problem that a distribution process is not correctly performed. According to one embodiment, it is possible to solve such a problem by setting rules in consideration of an execution sequence, a data dependency relation, a control dependency relation, and a data type and identifying a part at which application operation does not change even when it is partitioned and a part at which the operation changes. Accordingly, it is possible to partition a function defined by a developer such that it can be arranged in different machines without changing the operation of the entire application without depending on function definition performed by the developer.

OTHER EMBODIMENTS

Meanwhile, the present invention is not limited to the above-described embodiment. For example, although the edge servers ESV1, ESV2, . . . , ESVi are in charge of the application distribution process in the embodiment shown in FIG. 1, partitioned application logics may be executed on the user terminal UT which uses the application as illustrated in FIG. 6. In the same manner, partitioned application logics may also be executed on the cloud.

Furthermore, the user terminal UT does not necessarily use an application through the edge server ESV and may use an application arranged on the cloud through the Internet.

In addition, with respect to the determination sequences of rules 1 to 3, the present invention is not limited to the illustrated flow and may be modified and implemented in various manners without departing from essential characteristics of the present invention.

In conclusion, the present invention is not limited to the above-described embodiments and can be embodied by modifying components without departing from essential characteristics thereof in an implementation phase. In addition, various inventions can be formed according to appropriate combinations of a plurality of components disclosed in the above-described embodiments. For example, some components may be deleted from all components represented in embodiments. Further, components in different embodiments may be appropriately combined.

REFERENCE SIGNS LIST

1 Application partitioning apparatus
11 Communication interface unit
12 Processing unit
13 Storage unit
121 Source code acquisition unit
122 Source code partitioning unit
123 Determination unit
124 Function partitioning unit
125 Distributed arrangement unit
131 Determination rule storage
132 Edge server information storage
1251 Performance measurement unit
1252 Arrangement determination unit

The invention claimed is:

1. An application partitioning apparatus for partitioning an application distributively processed by a plurality of information processing apparatuses into a plurality of logics, comprising:
a processor; and
a storage medium having computer program instructions stored thereon, the computer program instructions when executed by the processor:
acquire source code of the application;
identify a plurality of functions defined in the source code and partition the source code into the plurality of functions;
determine whether each of the partitioned functions can be further partitioned according to rules set in advance;
when it is determined that each of the partitioned functions can be partitioned, partition the partitioned functions into a plurality of functions including one or a plurality of rows; and
determine that two functions can be partitioned on the basis of a determination that there is a data dependency relation or a control dependency relation between the two functions but an execution sequence is not reversed when the two functions have been partitioned according to the rules.

2. The application partitioning apparatus according to claim 1, wherein when executed the computer program instructions further allocate the plurality of functions to the plurality of information processing apparatuses.

3. The application partitioning apparatus according to claim 2, wherein when executed the computer program instructions further determine an optimal distributed arrangement to the plurality of information processing apparatuses in units of functions with respect to a function that has not been partitioned and in units of functions after partitioning with respect to the function that has been partitioned, among the plurality of functions defined in the source code.

4. The application partitioning apparatus according to claim 1, wherein when executed the computer program instructions further determine that two functions can be partitioned on the basis of a determination that a data dependency relation and a control dependency relation are not present between the two functions according to the rules.

5. The application partitioning apparatus according to claim 1, wherein when executed the computer program instructions further determine that two functions cannot be partitioned on the basis of a determination that there is a data dependency relation between the two functions due to a data type for which standard setting for serialization and deserialization is not made according to the rules.

6. An application partitioning method performed by one or more processors of an application partitioning apparatus for partitioning an application distributively processed by a plurality of information processing apparatuses into a plurality of logics, the method comprising:
acquiring source code of the application;
identifying a plurality of functions defined in the source code; partitioning the source code into the plurality of functions;

determining whether each of the partitioned functions can be further partitioned according to rules set in advance;

when it is determined that each of the partitioned functions can be partitioned, partitioning the partitioned functions into a plurality of functions including one or a plurality of rows; and determining that two functions can be partitioned on the basis of a determination that there is a data dependency relation or a control dependency relation between the two functions but an execution sequence is not reversed when the two functions have been partitioned according to the rules.

7. The method of claim 6 further comprising allocating the plurality of functions to the plurality of information processing apparatuses.

8. The method of claim 6 further comprising determining an optimal distributed arrangement to the plurality of information processing apparatuses in units of functions with respect to a function that has not been partitioned and in units of functions after partitioning with respect to the function that has been partitioned, among the plurality of functions defined in the source code.

9. The method of claim 6 further comprising determining that two functions can be partitioned on the basis of a determination that a data dependency relation and a control dependency relation are not present between the two functions according to the rules.

10. The method of claim 6 further comprising determining that two functions cannot be partitioned on the basis of a determination that there is a data dependency relation between the two functions due to a data type for which standard setting for serialization and deserialization is not made according to the rules.

11. A non-transitory computer readable medium including instructions executable by one or more processor to:

acquire source code of the application, where the application is distributively processed by a plurality of information processing apparatuses into a plurality of logics;

identify a plurality of functions defined in the source code;

partition the source code into the plurality of functions;

determine whether each of the partitioned functions can be further partitioned according to rules set in advance;

when it is determined that each of the partitioned functions can be partitioned, partition the partitioned functions into a plurality of functions including one or a plurality of rows; and determine that two functions can be partitioned on the basis of a determination that there is a data dependency relation or a control dependency relation between the two functions but an execution sequence is not reversed when the two functions have been partitioned according to the rules.

12. The non-transitory computer readable medium of claim 11 further including instructions executable by the one or more processor to allocate the plurality of functions to the plurality of information processing apparatuses.

13. The non-transitory computer readable medium of claim 11 further including instructions executable by the one or more processor to determine an optimal distributed arrangement to the plurality of information processing apparatuses in units of functions with respect to a function that has not been partitioned and in units of functions after partitioning with respect to the function that has been partitioned, among the plurality of functions defined in the source code.

14. The non-transitory computer readable medium of claim 11 further including instructions executable by the one or more processor to determine that two functions can be partitioned on the basis of a determination that a data dependency relation and a control dependency relation are not present between the two functions according to the rules.

15. The non-transitory computer readable medium of claim 11 further including instructions executable by the one or more processor to determine that two functions cannot be partitioned on the basis of a determination that there is a data dependency relation between the two functions due to a data type for which standard setting for serialization and deserialization is not made according to the rules.

16. An application partitioning apparatus for partitioning an application distributively processed by a plurality of information processing apparatuses into a plurality of logics, comprising:

a processor; and a storage medium having computer program instructions stored thereon, the computer program instructions when executed by the processor:

acquire source code of the application;

identify a plurality of functions defined in the source code and partition the source code into the plurality of functions;

determine whether each of the partitioned functions can be further partitioned according to rules set in advance; and determine that two functions cannot be partitioned on the basis of a determination that there is a data dependency relation between the two functions due to a data type for which standard setting for serialization and deserialization is not made according to the rules.

17. The application partitioning apparatus according to claim 16, wherein when executed the computer program instructions further allocate the plurality of functions to the plurality of information processing apparatuses.

18. The application partitioning apparatus according to claim 16, wherein when executed the computer program instructions further determine an optimal distributed arrangement to the plurality of information processing apparatuses in units of functions with respect to a function that has not been partitioned and in units of functions after partitioning with respect to the function that has been partitioned, among the plurality of functions defined in the source code.

19. The application partitioning apparatus according to claim 16, wherein when executed the computer program instructions further determining that two functions can be partitioned on the basis of a determination that a data dependency relation and a control dependency relation are not present between the two functions according to the rules.

* * * * *